United States Patent
McNew

(10) Patent No.: US 10,011,285 B2
(45) Date of Patent: Jul. 3, 2018

(54) DEVICE, SYSTEM, AND METHOD FOR PICTORIAL LANGUAGE FOR AUTONOMOUS VEHICLE

(71) Applicant: TOYOTA MOTOR ENGINEERING & MANUFACTURING NORTH AMERICA, INC., Erlanger, KY (US)

(72) Inventor: John-Michael McNew, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/161,608

(22) Filed: May 23, 2016

(65) Prior Publication Data

US 2017/0334459 A1 Nov. 23, 2017

(51) Int. Cl.
*B60W 50/14* (2012.01)
*B60R 11/02* (2006.01)
*B60K 35/00* (2006.01)
*B60W 50/00* (2006.01)

(52) U.S. Cl.
CPC ........... *B60W 50/14* (2013.01); *B60K 35/00* (2013.01); *B60R 11/0229* (2013.01); *B60K 2350/1076* (2013.01); *B60R 2300/108* (2013.01); *B60W 2050/0088* (2013.01); *B60W 2050/0089* (2013.01); *B60W 2050/146* (2013.01); *B60W 2550/402* (2013.01)

(58) Field of Classification Search
CPC ...... B60W 30/08; B60W 50/10; B60W 50/14; B60W 2050/146; B60Q 1/525; B60Q 1/00; B60Q 9/008; G08G 1/16; G06T 11/60
USPC ............. 340/435, 438–439, 901; 701/1, 45; 345/633

See application file for complete search history.

(56) References Cited

U.S. PATENT DOCUMENTS

| 8,346,426 | B1 | 1/2013 | Szybalski et al. |
|---|---|---|---|
| 8,676,431 | B1 | 3/2014 | Mariet et al. |
| 8,706,342 | B1 | 4/2014 | Szybalski et al. |
| 8,738,213 | B1 | 5/2014 | Szybalski et al. |
| 8,818,610 | B1 | 8/2014 | Szybalski et al. |
| 9,008,961 | B2 | 4/2015 | Nemec et al. |
| 9,212,926 | B2 * | 12/2015 | Attard ................ G01C 21/36 |
| 9,569,984 | B2 * | 2/2017 | Stankoulov .......... G09B 19/167 |
| 2008/0167820 | A1 * | 7/2008 | Oguchi .............. B60W 40/09 701/301 |

(Continued)

*Primary Examiner* — Hung T Nguyen
(74) *Attorney, Agent, or Firm* — Oblon, McClelland, Maier & Neustadt, L.L.P.

(57) ABSTRACT

The autonomous vehicle visual language system displays a plan sentence to an operator of an autonomous vehicle. The plan sentence includes visual syntax, the visual syntax being images displayed in predetermined configurations to convey specific information associated with any maneuvers the autonomous vehicle plans to execute. The visual syntax allows for a structured layering of information such that the plan sentence can display more complex information. The operator of the autonomous vehicle can process individual warnings and information more quickly, even when the operator has never seen a particular warning or element of information before. Additionally, the system 100 allows for personalization of a driver model to more closely reflect the operator's driving style, which is then implemented in the visual language displayed as the plan sentence.

19 Claims, 13 Drawing Sheets

(56) References Cited

U.S. PATENT DOCUMENTS

| | | | |
|---|---|---|---|
| 2011/0169625 A1* | 7/2011 | James | B60Q 9/008 340/439 |
| 2012/0025969 A1* | 2/2012 | Dozza | B60Q 1/44 340/463 |
| 2012/0218093 A1* | 8/2012 | Yoshizawa | B60R 1/00 340/435 |
| 2012/0299713 A1* | 11/2012 | Elia | B60W 30/0956 340/435 |
| 2013/0179023 A1 | 7/2013 | Schmidt | |
| 2014/0222277 A1 | 8/2014 | Tsimhoni et al. | |
| 2014/0266656 A1 | 9/2014 | Ng-Thow-Hing et al. | |
| 2014/0306814 A1* | 10/2014 | Ricci | H04W 48/04 340/425.5 |
| 2014/0354684 A1* | 12/2014 | Beckwith | G06F 3/011 345/633 |
| 2015/0091740 A1* | 4/2015 | Bai | G08B 21/06 340/901 |
| 2015/0134180 A1 | 5/2015 | An et al. | |
| 2015/0321699 A1 | 11/2015 | Rebhan et al. | |
| 2016/0298971 A1* | 10/2016 | Mughal | B60W 50/14 |
| 2016/0362118 A1* | 12/2016 | Mollicone | B60W 40/09 |

\* cited by examiner

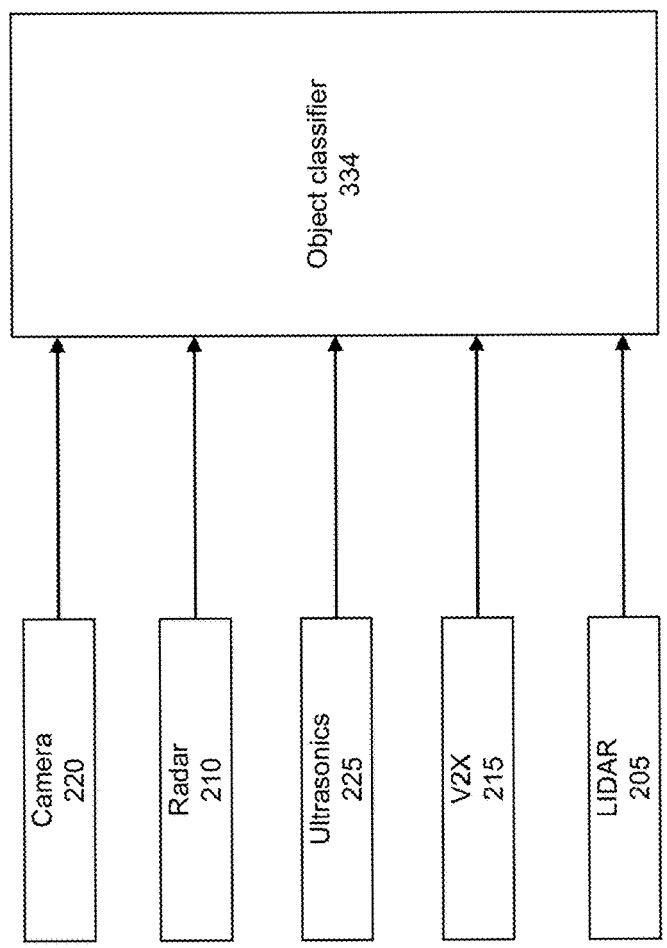

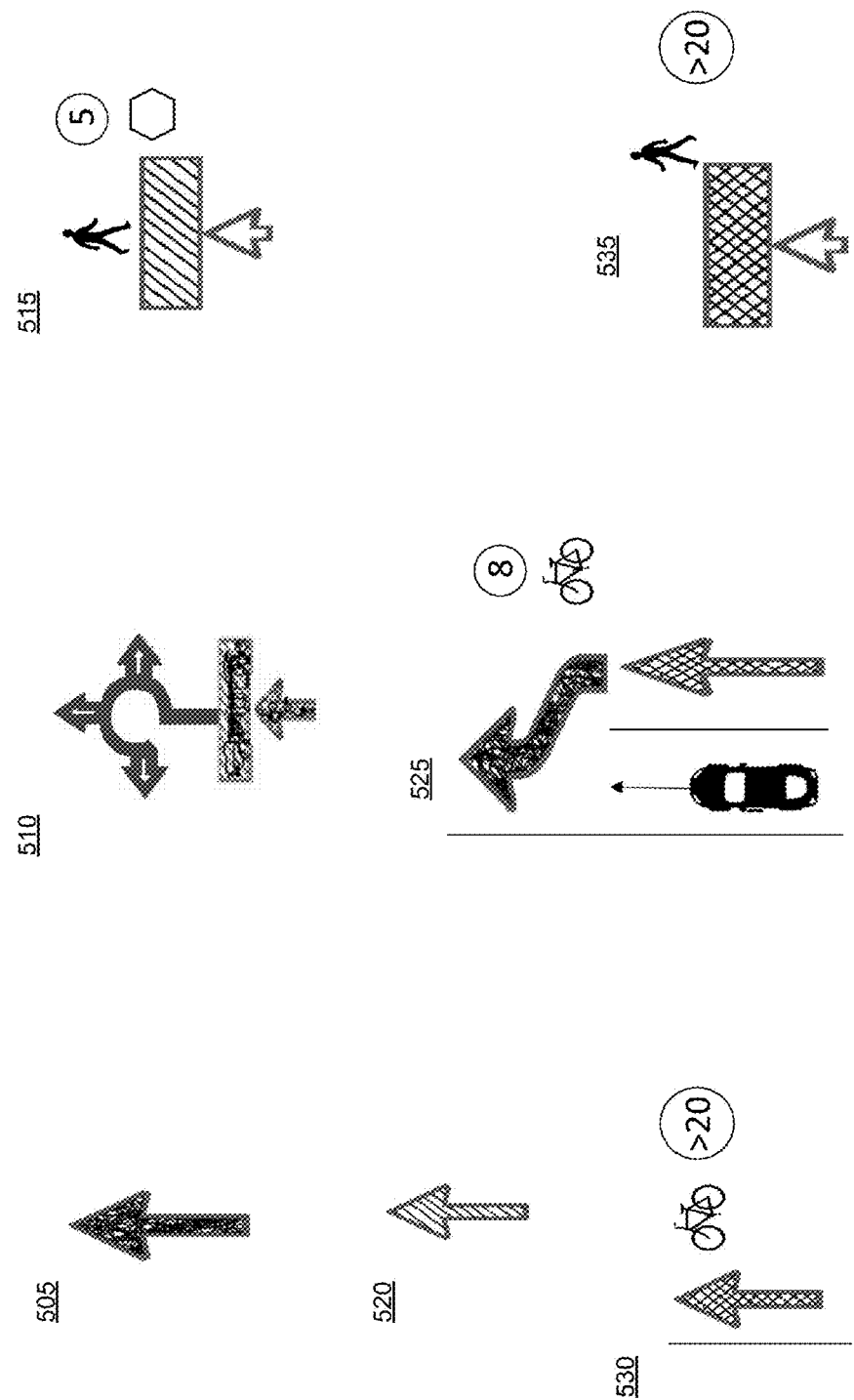

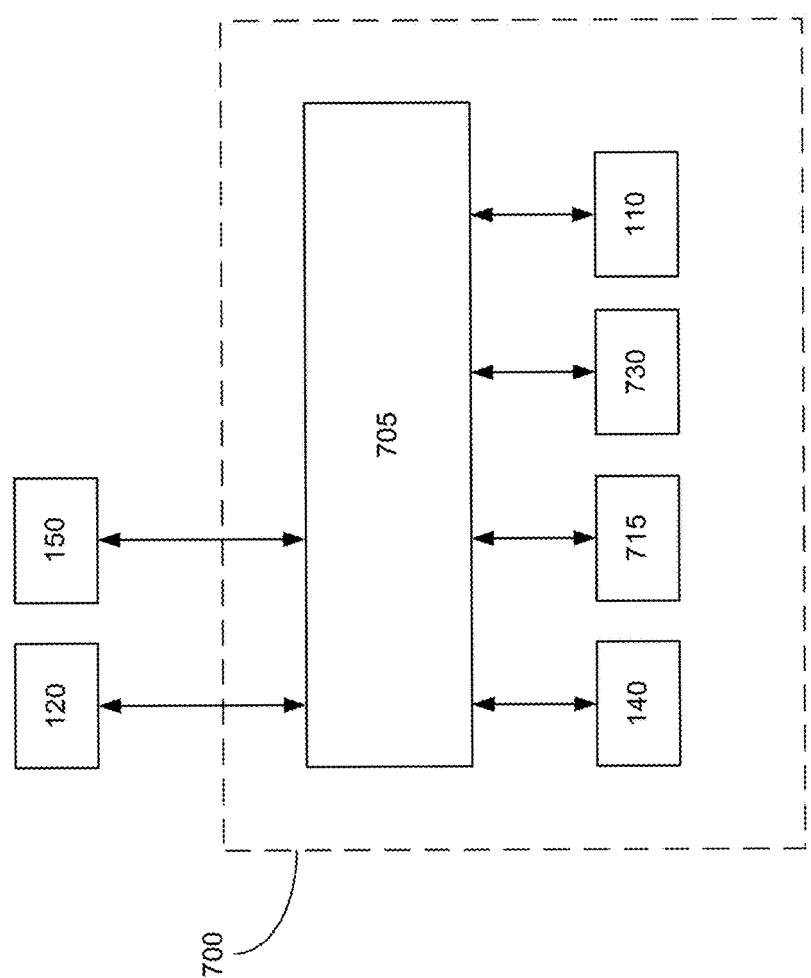

DEVICE, SYSTEM, AND METHOD FOR PICTORIAL LANGUAGE FOR AUTONOMOUS VEHICLE

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Autonomous vehicles use various computing systems to transport passengers from one location to another. A control computer sends messages to the various systems of the vehicle in order to maneuver the vehicle safely to the destination. The control computer may display information on an electronic display in order to allow the passenger to understand any actions the vehicle may be taking in the future as well as information regarding a vehicle's surrounding environment. Various icons and images may be used to provide this information to the passenger.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

An autonomous vehicle visual language system can convey a consistent visual language to an operator of the vehicle. The visual language can include a visual syntax where visual elements share a common basis that allows a structured layering of information to display complex information. When the visual language including the visual syntax is applied to all scenarios and warning types, the operator can process individual warnings and information more quickly, even when the operator has never seen a particular warning before. The autonomous vehicle visual language system provides a visual language for the planned route of the autonomous vehicle.

The visual language can be displayed in an autonomous vehicle. The visual language can be composed of one or more of visual parts of speech including nouns, verbs, adverbs, and objects. A combination of the parts of speech based on specific information can compose a plan-sentence. A purpose of the plan sentence can be to communicate to the driver the intended sequence of actions by the vehicle, the reasons underlying the action, the expected accuracy of the plan's execution, and locations where driver action or involvement is required. The output plan sentence can be displayed using the visual language on an instrument cluster, navigation system, heads-up display, and the like.

The visual language can also be personalized. When a human-machine interface (HMI) displays a plan-sentence, the operator's actions comprise a driver response sentence. When one or more of the segments of the driver response sentence doesn't match the plan sentence, an opportunity for learning or personalization occurs. After a predetermined number of times when the driver response sentence doesn't match the plan sentence, the information from the driver response sentence can be incorporated into future plan sentences to customize the operator experience.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4D depicts an exemplary construction of an object classifier for the visual language according to one or more embodiments of the disclosed subject matter.

FIG. 5 depicts exemplary plan sentences according to one or more embodiments of the disclosed subject matter.

FIG. 7 depicts an exemplary control system for the autonomous vehicle visual language system according to one or more embodiments of the disclosed subject matter.

DETAILED DESCRIPTION

Figure 1:
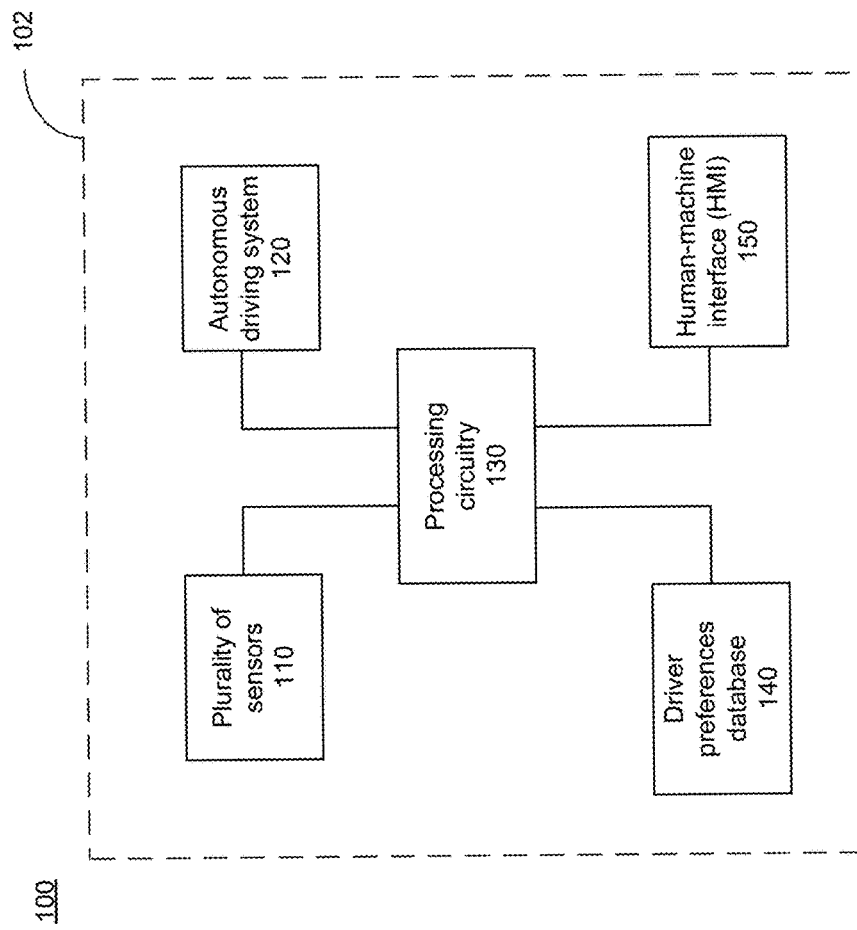
FIG. 1 depicts a block diagram of an autonomous vehicle visual language system according to one or more embodiments of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

FIG. 1 is a block diagram of an autonomous vehicle visual language system 100 (herein referred to as the system 100) according to one or more embodiments of the disclosed subject matter. As will be discussed in more detail later, one or more methods according to various embodiments of the disclosed subject matter can be implemented using the system 100 or portions thereof. Put another way, system 100, or portions thereof, can perform the functions or operations described herein regarding the various methods or portions thereof (including those implemented using a non-transitory computer-readable medium storing a program that, when executed, configures or causes a computer to perform or cause performance of the described method(s) or portions thereof).

System 100 can comprise a plurality of sensors 110, an autonomous driving system 120, a processor or processing circuitry 130 (which can include internal and/or external memory), a driver preferences database 140, and a human-machine interface (HMI) 150. In one or more embodiments, the plurality of sensors 110, autonomous driving system 120, the processing circuitry 130, the driver preferences database 140, and the HMI 150 can be implemented in apparatus 102, such as an autonomous vehicle, for instance. Further, the aforementioned components can be electrically connected or in electrical or electronic communication with each other as diagrammatically represented by FIG. 1, for example.

Generally speaking, the system 100 can cause or allow a visual language to be displayed in the autonomous vehicle.

More specifically, the visual language can be composed of one or more of visual parts of speech including nouns, verbs, adverbs, and objects displayed as images and/or colors. A combination of the images associated with the different parts of speech based on specific information received from the plurality of sensors 110 and a driver model can compose a plan-sentence. In particular, the particular set of parts of speech and the particular syntax represent one embodiment of plan sentence generation. These parts of speech and syntax may be changed, or added to, based on the needs of the autonomous vehicle system. The term autonomous is used generally to describe any vehicle which is capable of operating in a highly automated mode for some portion of a drive and not limited to a vehicle which can take a passenger from origin to destination without any interaction with the driver or periods of driver control.

The plurality of sensors 110 can include various sensors that are not only responsible for safely operating the autonomous vehicle, but also for gathering relevant information about the environment of the autonomous vehicle such that the environment of the autonomous vehicle includes information about the performance of the autonomous vehicle itself. For example, the plurality of sensors 110 may determine that a pedestrian is crossing the street ahead of the autonomous vehicle. Therefore, the autonomous vehicle will need to slow down and possibly stop until the pedestrian has cleared from the path of the autonomous vehicle.

The autonomous driving system 120 can include various mechanisms to mechanically operate an autonomous vehicle. For example, the mechanisms can include a motor in each wheel to rotate the wheel, an actuator to automatically operate the steering wheel, one or more mechanisms to cause the vehicle to accelerate via a gas pedal disposed in the vehicle, decelerate via a braking mechanism disposed in the vehicle, and the like, as well as any mechanisms that are required to operate a vehicle in general whether or not they are specifically operated by the autonomous mode. Therefore the autonomous vehicle system 120 can operate the autonomous vehicle mechanically and in response to signals received from the processing circuitry 130 as would be known by one or ordinary skill in the art.

The processor or processing circuitry 130 can carry out instructions to perform or cause performance of various functions, operations, steps or processes of the system 100. The processor/processing circuitry 130 can be configured to store information in memory, operate the system 100, control the autonomous driving system 120, store/access data in the driver preferences database 140 (e.g., the driver model), and display and receive signals via the HMI 150.

The HMI 150 can be a user interface where interaction between a human and a control system can occur. The HMI 150 can display the visual language, receive input from the operator of the autonomous vehicle, and the like. The HMI can be a part of the vehicle or may be a portable device such as cell phone, tablet, smart watch, google class, etc.

Figure 2:
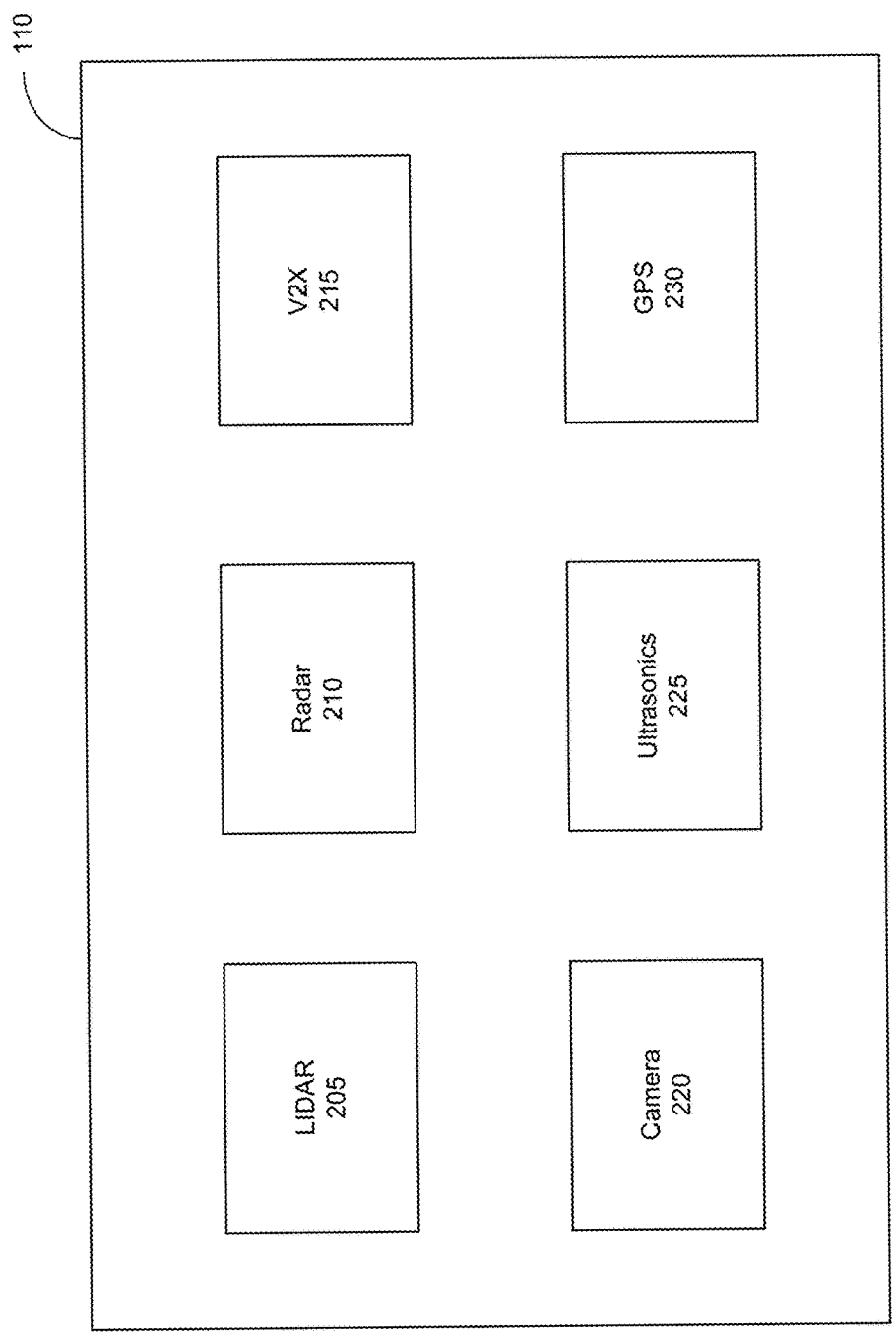
FIG. 2 depicts a block diagram of a plurality of sensors utilized in the autonomous vehicle visual language system according to one or more embodiments of the disclosed subject matter.

FIG. 2 is a block diagram of the plurality of sensors 110. The plurality of sensors 110 can include LIDAR 205, Radar 210, V2X 215, at least one camera 220, ultrasonics 225, and GPS 230.

The LIDAR 205 is a remote sensing technology that can be utilized to measure distance by analyzing reflected laser light. Radar 210 is an object detection system that uses radio waves. V2X 215 can be utilized for vehicle communications and telematics. In other words, two-way, short range wireless communications can allow the autonomous vehicle to wirelessly exchange data with other vehicles and traffic lights, for example. The at least one camera 220 can be utilized for image recognition of the environment of the autonomous vehicle including identifying speed limit signs and other road signs, recognizing one or more operators of the autonomous vehicle, and the like. The ultrasonics 225 are sound waves with frequencies higher than an upper audible limit of human hearing and can be utilized to detect objects and measure distance. Additionally, the ultrasonics 225 may be utilized for wireless communications. The GPS 230 can be utilized to monitor the position of the autonomous vehicle, and assist in navigating the vehicle. It should be appreciated that the GPS may operate most precisely when combined with a map. A map for an autonomous vehicle may include other meta-information such as rules of the road or those laws and rule roads may be held in a separate database and accessed by a position system as further described herein. Various rules/laws of the road can be associated with the position of the autonomous vehicle, and the like. It should be appreciated that any sensor can be included in the plurality of sensors 110 such that the sensor may improve the safety and/or the precision with which an autonomous vehicle operates as would be known by one or ordinary skill in the art, and therefore, may be able to obtain more information and more precise information about the environment of the autonomous vehicle.

Figure 3:
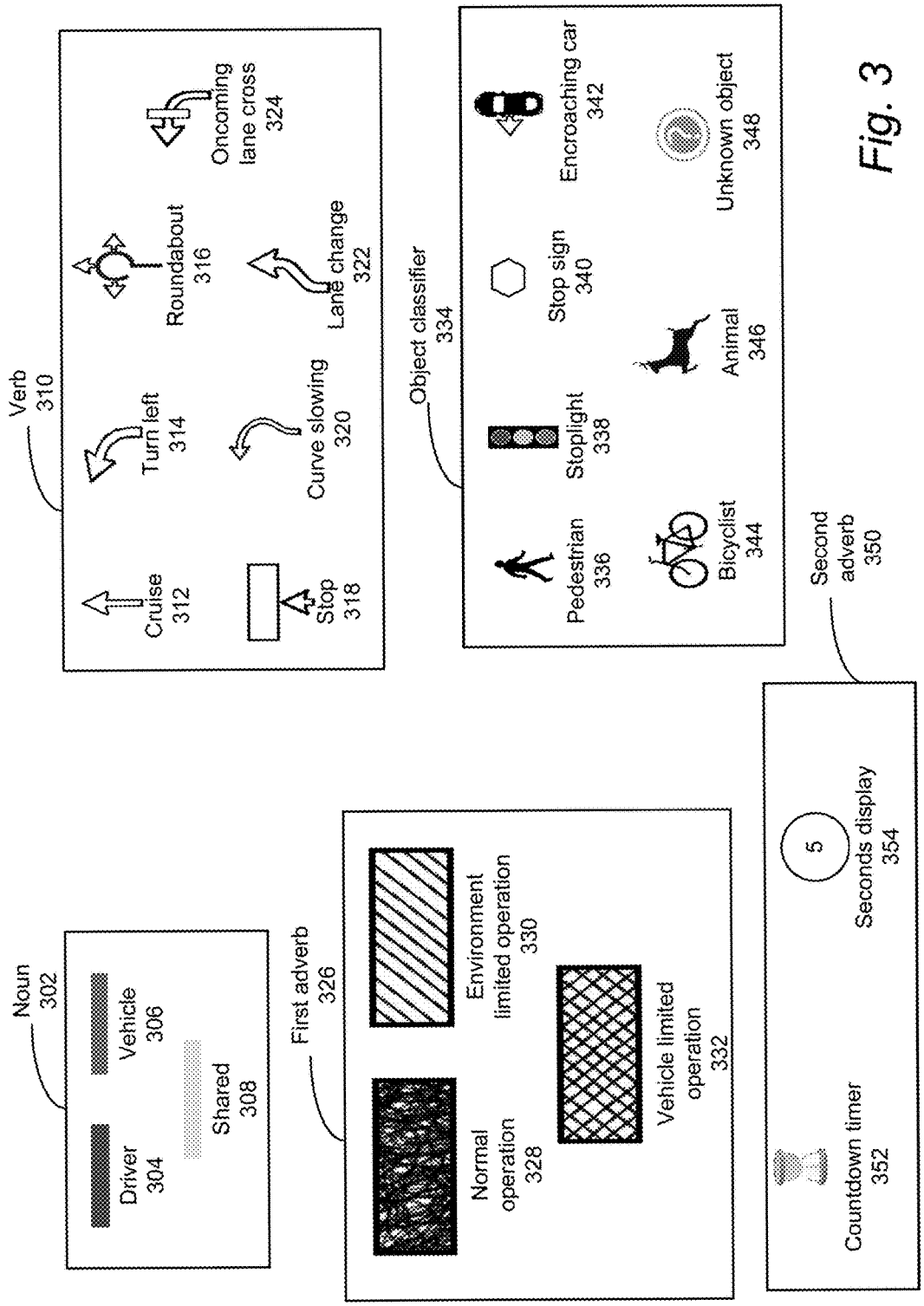
FIG. 3 depicts visual examples of parts of speech for composing the visual language according to one or more embodiments of the disclosed subject matter.

FIG. 3 depicts visual examples of parts of speech for composing the visual language according to one or more embodiments of the disclosed subject matter. The parts of speech for the visual language can include a noun 302, a verb 310, a first adverb 326, an object classifier 334, and a second adverb 350.

The noun 302 can determine who is or should be in control of the autonomous vehicle. For example, the autonomous vehicle can be controlled by a driver 304 in a manual driving mode, a vehicle 306 as in the autonomous vehicle autonomously operates the vehicle, or a shared 308 operation, wherein the shared operation may be partially operated by the driver and the driver is assisted autonomously. It should be appreciated that a driver 304 and a vehicle 306, for example, correspond to a color that identifies a noun 302 in the plan sentence. Therefore, a vehicle 306 may be the vehicle noun 306, for example.

The verb 310 can be an image associated with a specific action based on a structure of the road, rules/laws of the road, destination, and the like. The verb 310 can include cruise 312, turn left 314, roundabout 316, stop 318, curve slowing 320, lane change 322, and oncoming lane cross 324.

The first adverb 325 can describe the expected operation quality of the system based off what the system 100 considers to be normal operation under current road environment and/or road conditions. Normal operation can be based on a driver model stored in the driver preferences database 140, for example, as further described herein. The first adverb 325 can include an image associated with a normal operation 328, an environment limited operation 330 whose quality is limited or degraded by the environment (for instance if a road is filled with potholes, the vehicle will move more slowly), and a vehicle limited operation 332 (for instance if the vehicle sensing range is degraded, the vehicle may choose to move more slowly than the driver).

The object classifier 334 can be determined via one or more of the plurality of sensors 110 to identify one or more objects in the environment of the autonomous vehicle. The object classifier 334 can include an image associated with a pedestrian 336, a stoplight 338, a stop sign 340, an encroaching car 342, a bicyclist 344, an animal 346, and an unknown object 348.

The second adverb 350 can be an image associated with how long a particular plan sentence will take. The second adverb 350 can be an image associated with a countdown timer 352 and a seconds display 354.

It should be appreciated that the images and colors associated with each of the noun 302, verb 310, first adverb 326, object classifier 334, and second adverb 350 can be any image and color that can be quickly and easily understood by the operator of the autonomous vehicle. Additionally, the visual language can be exhaustive to capture all combinations of situations an autonomous vehicle may encounter that need to be displayed to inform the operator of the vehicle, and therefore, the images depicted in FIG. 3 are exemplary and are not intended to be limiting as many other images and/or colors may be included in each part of speech to further develop and complete the visual language.

Further, an image depicting an arrow such as turn left 314 can be mirrored to indicate turn right, for example, when the arrow is curved to the right.

Figure 4A:
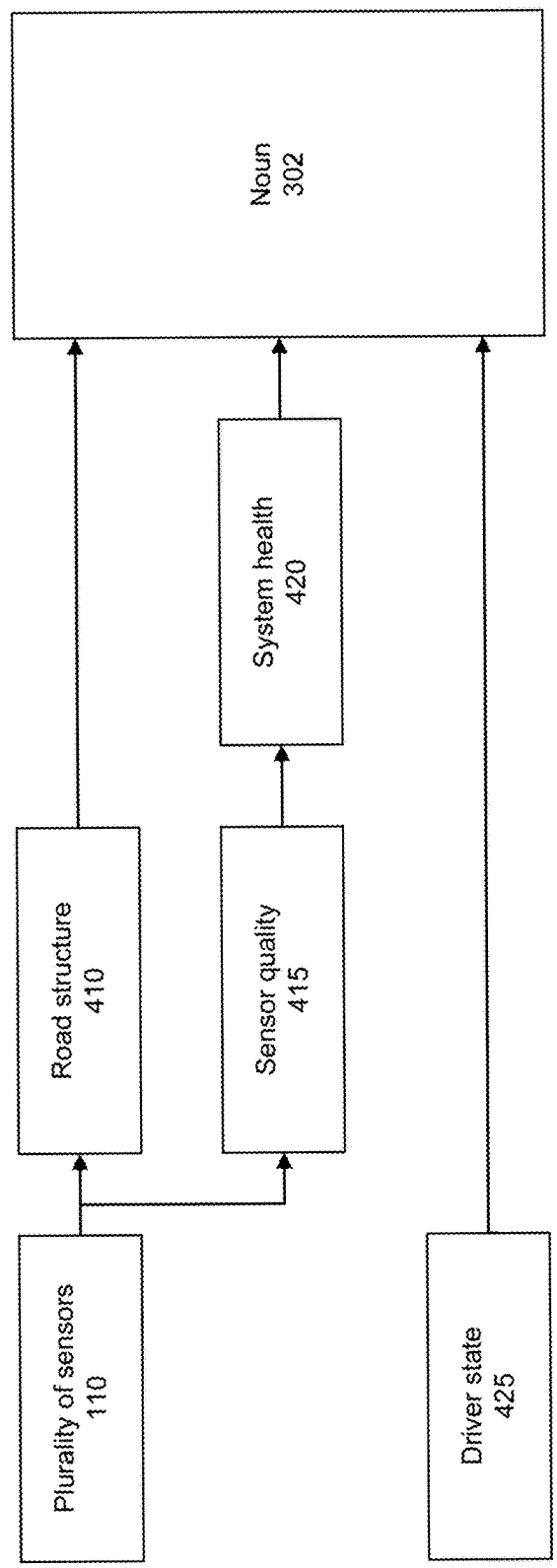
FIG. 4A depicts an exemplary construction of a noun for the visual language according to one or more embodiments of the disclosed subject matter.

FIG. 4A depicts a determination of the noun 302 according to one or more embodiments of the disclosed subject matter. One or more of the plurality of sensors 110 can be utilized to determine a road structure 410 and a sensor quality 415 which defines the expected accuracy and availability of information from each sensor. The road structure 410 can be determined via a combination of map data, camera 220, radar 210, and/or LIDAR 205, for example. The sensor quality 415 can be further utilized to determine a system health 420 which describes the capacity of the vehicle to operate correctly using the current sensing and actuator performance. In addition to the plurality of sensors 110, a driver state 425, which describes the capacity of the driver to see and instigate control overrides, can be utilized to determine the noun 302. The road structure, system health, and driver state are combined to determine the safety of remaining in autonomous mode. The assignment of determining driver 304, shared 308, and vehicle 306, for instance, can be based, in part or entirely, on this safety rating.

Figure 4B:
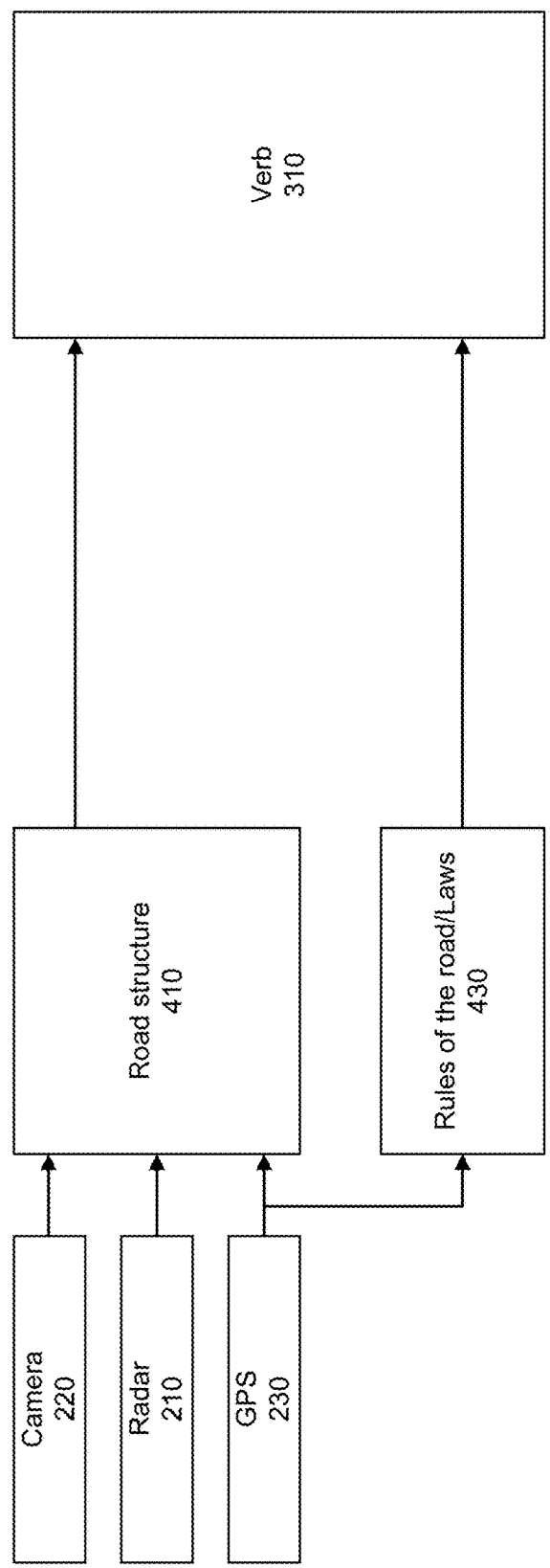
FIG. 4B depicts an exemplary construction of a verb for the visual language according to one or more embodiments of the disclosed subject matter.

FIG. 4B depicts a determination of the verb 310 according to one or more embodiments of the disclosed subject matter. The camera 220, the radar 210, and the GPS 230 can be utilized to determine road structure 410. Additionally, the GPS can be utilized to determine rules/laws 430 associated with the location of the vehicle (e.g., speed limit, school zone, no turn on red at certain times of day, etc.). Therefore, the road structure 410 based on output from the camera 220, radar 210, and GPS 230, and the rules/laws of the road 430 based on the location determined by GPS 230 can determine the verb 310.

Figure 4C:
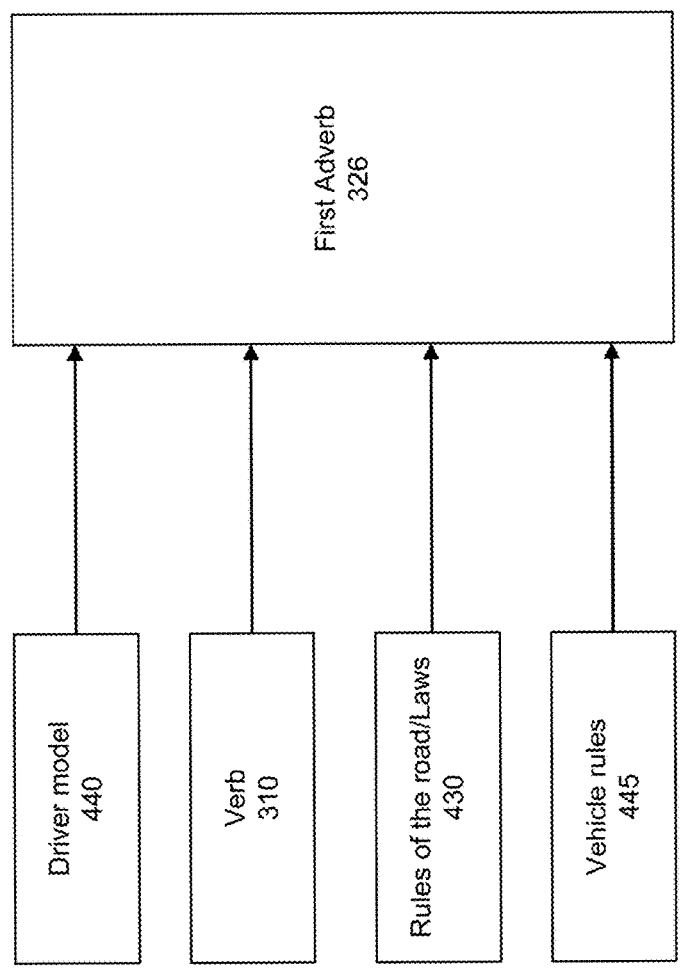
FIG. 4C depicts an exemplary construction of a first adverb for the visual language according to one or more embodiments of the disclosed subject matter.

FIG. 4C depicts a determination of the first adverb 326 according to one or more embodiments of the disclosed subject matter. A driver model 440, the verb 310, the rules/laws of the road 430, and vehicle rules 445, which can define what maneuvers a vehicle is allowed to execute and how the maneuvers are executed, can be utilized to determine the first adverb 326. For instance, a vehicle rule might require that the vehicle have a four second gap to make an unprotected left turn. The driver model 440 can be the preferences of the specific operator of the autonomous vehicle in various situations or may be a more general model of the average preferences of a driver. For example, the operator may prefer a more aggressive driving style or a more cautious driving style. Therefore, the driver model 440 may predict the aggressive driver will make an unprotected turn with only a 2 second gap. Because the waiting time for the autonomous operation is longer than the expected driver action, and because it is specifically the vehicle rule which is making the waiting time longer, the operating quality adverb can be set to vehicle limited operation 332, for example.

FIG. 4D depicts a determination of the object classifier 334 according to one or more embodiments of the disclosed subject matter. The at least one camera 220, the radar 210, the ultrasonics 225, the V2X 215, and the LIDAR 205 can be utilized to determine the object classifier 334 by identifying the one or more objects in the environment of the autonomous vehicle.

Figure 4E:
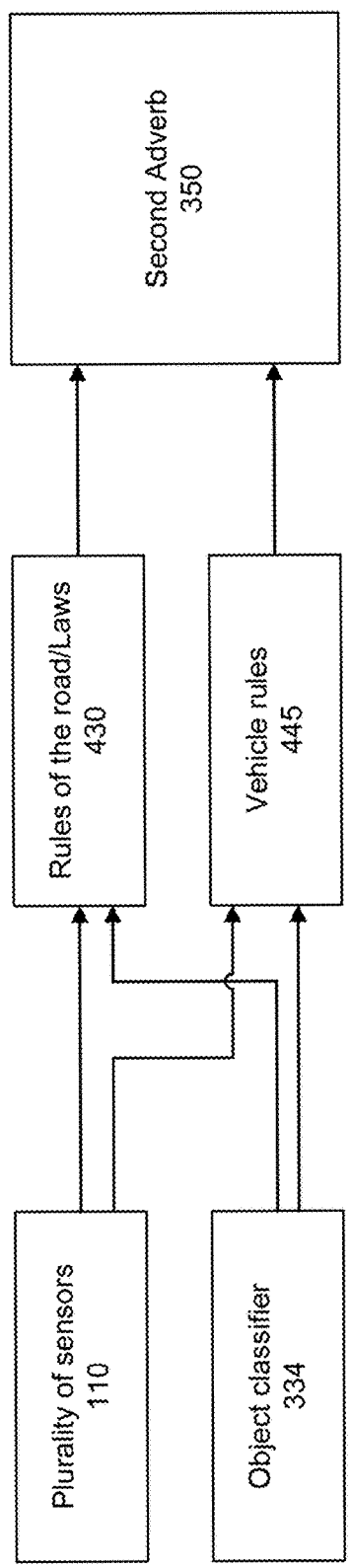
FIG. 4E depicts an exemplary construction of a second adverb for the visual language according to one or more embodiments of the disclosed subject matter.

FIG. 4E depicts a determination of the second adverb 350 which can describe how long the vehicle is expected to remain in an operating condition below normal according to one or more embodiments of the disclosed subject matter. The object classifier 334 can be used in conjunction with the plurality of sensors 110 to determine the future path of the object. This in conjunction with the rules of the road 430 and the vehicle rules 445 can be used to determine the second adverb 350. For instance, a vehicle which is forced to stop for a pedestrian can first classify the pedestrian. Using the plurality of sensors 110 and the classification via the object classifier 334, a future path of the pedestrian can be determined. Additionally, determining a combination of rules of the road 430 and vehicle rules 445, the point in the pedestrian's path at which the vehicle can continue forward based on the plurality of sensors 110, and an estimation of the amount of time necessary to wait for the pedestrian to cross based on the plurality of sensors 110, can determine the second adverb 350.

Using a combination of one or more of the parts of speech as determined in FIGS. 4A-4E, a plan sentence can be constructed in the visual language. The plan sentence can be a combination of the images and/or colors such that information relevant to the operator of the vehicle can be quickly seen and understood. The visual language and the visual syntax of the visual language allows the operator to see and understand the displayed warning and or information even when the operator has not seen a specific image, color, or combination of images and/or colors.

FIG. 5 depicts exemplary plan sentences displayed via the visual language according to one or more embodiments of the disclosed subject matter. Using a combination of a green outline to indicate a vehicle noun 306, a straight arrow indicating a cruise verb 312, and fill of the straight arrow indicating the normal operation adverb 328 can construct a plan sentence resulting in "vehicle cruising normally" 505. The plan sentence of "vehicle cruising normally" 505 is composed of a noun 302, a verb 310, and a first adverb 326.

Using a combination of the image indicating a stop verb 318 outlined in green indicating the vehicle noun 306 filled in with the image indicating normal operation adverb 328, and the roundabout verb 316 in the color red indicating the driver noun 304 can construct a plan sentence resulting in "the vehicle will cruise and stop normally to a roundabout where the driver must take over" 510, for example. In other words, the autonomous vehicle is coming to a stop because the autonomous vehicle cannot maneuver through the roundabout autonomously, thereby indicating that the operator of the autonomous vehicle should take over the controls and manually maneuver the vehicle through the roundabout.

Using a combination of the image indicating the stop verb 318 outlined in green indicating the vehicle noun 306 filled in with the environment limited operation adverb 330 and displaying the pedestrian object 336, the seconds display 354, and the stop sign 340 can construct a plan sentence resulting in "normal pedestrian stop, vehicle will resume in 5 seconds" 515. The system 100 can detect the stop sign 340 and the pedestrian 336 crossing the street and can estimate that the autonomous vehicle will be stopped for 5 seconds (displayed via the seconds display 354) while the pedestrian 336 crosses the street. The seconds display 354 can display a best estimate for how long the autonomous vehicle will wait until executing the next vehicle maneuver.

Using a combination of an image indicating the cruise verb 312 outlined in green indicating the vehicle noun 306 and filled in with an image indicating the environment limited operation adverb 330 can construct a plan sentence resulting in "vehicle cruising slowly heavy traffic" 520.

Using a combination of an image indicating the cruise verb 312 in a vehicle limited operation 332 outlined in green indicating the vehicle noun 306, an image indicating lane change 322 filled in with normal operation adverb 328 and outlined in green indicating the vehicle noun 306, the seconds display 354 indicating 8 seconds, and a bicyclist object 344 can construct a plan sentence resulting in "slowed by bicyclist but adjacent lane will open" 525. The system 100 can determine that a bicyclist is in front of the autonomous vehicle and a vehicle is to the left of the autonomous vehicle creating a situation where the maneuvers available to the autonomous vehicle are limited. The system 100 can determine that the adjacent lane will open in an estimated 8 seconds and the autonomous vehicle will then change lanes and resume driving in a normal environment.

Using a combination of the cruise verb 312 filled in with the vehicle limited operation adverb 332 outlined in green to indicate the vehicle noun 306, the bicyclist object 344, and the seconds display 354 indicating an estimate of greater than 20 seconds can construct a plan sentence resulting in "vehicle cruising stopped by difficult estimate bicyclist in one-lane road" 530. The seconds display 354 displays >20 to indicate that the system 100 is unsure how long it will take before the environment limited operation 330 will return to normal operation 328. Although the number 20 is exemplary and is only meant to indicate that the system is unsure when the autonomous vehicle will be able to return to the normal operation 328, and it gives the operator the ability to identify that the autonomous vehicle is having difficulty (in particular due to its own sensing capabilities and perhaps passing rules as indicated by the operation adverb) and that it may be in the operator's interest to take over control of the vehicle to safely maneuver around the bicyclist 344.

Using a combination of the stop verb 318 filled in with vehicle limited operating adverb 332 outlined in green indicating the vehicle noun 306, a pedestrian object 336, and a seconds display 354 indicating greater than 20 seconds can construct a plan sentence resulting in "pedestrian with unknown intention near road edge, vehicle can't go forward" 535. The system 100 can determine, via one or more of the plurality of sensors 110 to identify an object classifier 334, for example, that the pedestrian 363 is at the edge of the road. The autonomous vehicle may be stopping because the system 100 is unsure if the pedestrian is finishing crossing the street and more likely may be about to begin crossing the street. Therefore, the seconds display 354 can display the image >20 to indicate that it may be in the interest of the operator of the autonomous vehicle to assess the situation. For example, if the operator can clearly identify what action the pedestrian 363 is intending to take (e.g., the pedestrian is standing on the edge of the street but clearly not intending to cross the street), the operator may be able to manually execute the appropriate vehicle maneuver much more quickly than the autonomous vehicle.

FIG. 6A through FIG. 6D depicts exemplary personalization of the plan sentences according to one or more embodiments of the disclosed subject matter.

Figure 6A:
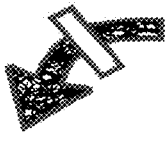
FIG. 6A-6D depicts exemplary personalization of the plan sentences according to one or more embodiments of the disclosed subject matter.

FIG. 6A depicts an exemplary plan sentence 605 generated by the system 100. The plan sentence 605 is a combination of an oncoming lane cross verb 324 filled in with environment limited operation adverb 330 and outlined in green indicating the vehicle noun 306, and the seconds display 354 indicating less than 5 seconds, meaning the vehicle is expected to make the turn in less than 5 seconds. The plan sentence 605 indicates that the car is stopped because there are no gaps in oncoming traffic greater than 3 seconds, which the system 100 believes is normal driving such that normal driving is believed to be within the driving style/preferences of the operator of the autonomous vehicle.

Figure 6B:
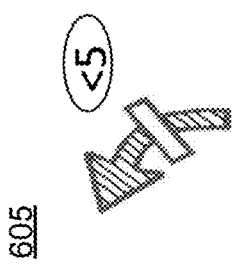

FIG. 6B depicts a driver response sentence 610. The driver response sentence is a result of the operator taking manual control of the autonomous vehicle and executing a vehicle maneuver. The vehicle maneuver executed by the operator of the autonomous vehicle after taking over may or may not be the same as the vehicle maneuver indicated by the plan sentence displayed. Driver response sentence 610 is image indicating oncoming lane cross 324 filled in with normal operating adverb 328 and outline in red to indicate the driver noun, which can construct a driver response sentence indicating that the operator of the autonomous vehicle takes over control and threads a 1 second gap, the red outline indicating that the driver response sentence 610 does not match the plan sentence 605 that was waiting for at least a 3 second gap.

If any driver response sentence does not match the same displayed plan sentence more than a predetermined number of times, then the system 100 can personalize the visual language such that the plan sentence displayed better reflects the operator's preferences. The personalization of the visual language can be stored in the driver preferences database 140, for example, as the driver model 440.

Figure 6C:
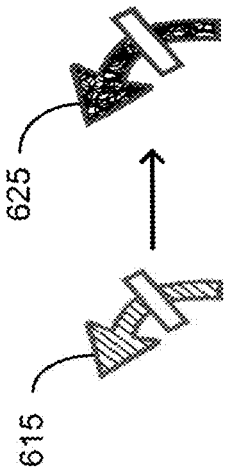

FIG. 6C displays a plan sentence 615 filled in with an environment limited operation 330. If the driver takes over multiple times, but waits as long as the vehicle specified plan sentence, then the driver model is changed to reflect that waiting for a 3 second gap is the normal operation for this maneuver. This results in an update to the plan sentence. Plan sentence 615 has been updated in plan sentence 620 to be filled in with normal operation adverb 328 indicating that the first adverb 326 has been changed as a result of the personalization of the visual language. The change of the first adverb 326 for the specific situation for which it was updated can be included in the driver model 440.

Figure 6D:
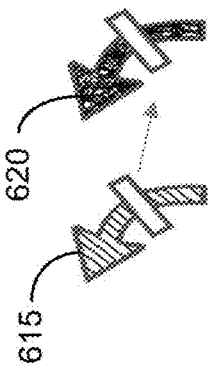

FIG. 6D depicts the plan sentence 615 being updated to indicate a change of the noun 302. For example, when the driver takes over and turns in a 1 second gap that is forbidden by the vehicle rules, then the system 100 may recommend the operator executes the vehicle maneuver manually the next time the situation arises. The change of the noun 302 for the specific situation for which it was updated can be included in the driver model 440 to further personalize the visual language.

FIG. 7 depicts control aspects of a system 700 according to one or more embodiments of the disclosed subject matter. Optionally, system 700 can represent control aspects (i.e., controlee components and controller components) of system 100 for FIG. 1.

In FIG. 7, the system 700 can include a control circuit 705, the plurality of sensors 110, the autonomous driving system 120, the driver preferences database 140, the HMI 150, a positioning system 715, and a wireless receiver/transmitter 730.

The control circuit 705, which may be representative of processor/processing circuitry 130, can be configured to perform or cause performance of multiple functions, including receiving, monitoring, recording, storing, indexing, processing, and/or communicating data. The control circuit 705 can be integrated as one or more components, including memory, a central processing unit (CPU), Input/Output (I/O) devices or any other components that may be used to run an application. The control circuit 705 can be programmed to execute a set of predetermined instructions. Various instructions including lookup tables, maps, and mathematical equations can be stored in memory, however, it should be appreciated that the storing or reading of such information can be accomplished with alternative types of computer-readable media including hard disks, floppy disks, optical media, CD-ROM, or other forms of RAM or ROM. Additionally, other circuitry including power supply circuitry, signal-conditioning circuitry, solenoid driver circuitry, and communication circuitry can be included in the control circuit 705. Further, it should be appreciated that the control circuit 705 can include multiple controllers wherein each controller is dedicated to perform one or more of the above mentioned functions.

The control circuit 705 can be communicably coupled to the plurality of sensors 110. Each of the sensors 110 can provide output signals indicative of parameters related to the environment of the stand-alone apparatus 102, such as the autonomous vehicle, via the system 100. The plurality of sensors 110 can be located in various positions on the stand-alone apparatus 102 such that the sensors are able to allow the vehicle to operate autonomously and identify various aspects of the surrounding environment. The control circuit 705 can receive signals from each of sensors 110.

Optionally, the control system 700 can include a positioning system 715 configured to determine the location of the system 100. In an embodiment, the positioning system 715 can be a satellite positioning system such as GPS 230. The control circuit 705 is communicably coupled to the positioning system 715 to continuously or periodically track the location of the system 100. The control system 700 can be configured to wired and/or wirelessly receive signals through a communicably coupled receiver/transmitter 730. Wireless communication can be any suitable form of wireless communication including radio communication, a cellular network, or satellite-based communication. Additionally, the positioning system 715 can operate in combination with the plurality of sensors 110 and any rules of the road to more precisely determine the position of the vehicle.

Figure 8:
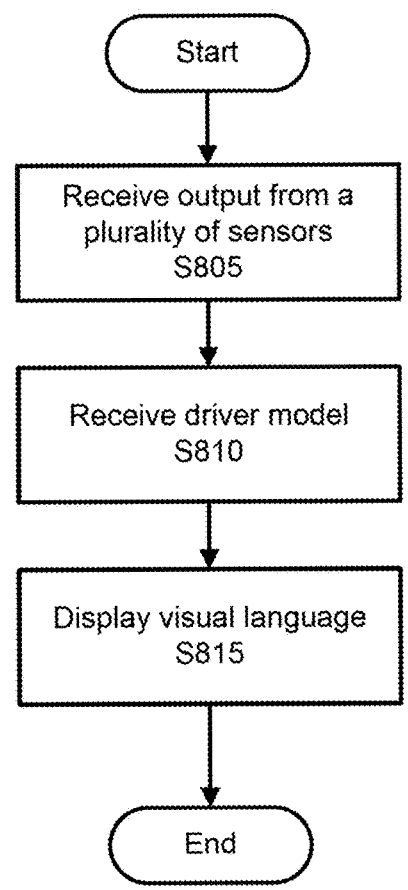
FIG. 8 is a flowchart of a method for displaying the visual language.

FIG. 8 is a flowchart of a method for causing the system 100 to display the visual language.

In S805, output from the plurality of sensors 110 can be received indicating various aspects of the environment of the autonomous vehicle.

In S810, the system 100 can receive the driver model 440. The driver model can be stored in the driver preferences database 140, for example. The driver model 440 contains personalization information for the visual language for certain situations as updated based on any driver response sentences. Additionally, as there may be more than one operator of the autonomous vehicle, the at least one camera 220 can be utilized to identify a specific operator and associate an operator profile with the identified operator so the system 100 knows which personalization of the visual language to implement. The visual language can then be displayed via plan sentences as described herein.

In S815, the system 100 can display the visual language. The visual language can be displayed via various display mechanism including a liquid crystal display (LCD), a heads up display (HUD), a hologram display system, and the like. Additional display mechanisms may include portable devices paired to the vehicle including smartphones, tablets, smart glasses, smart watches, and the like. After the visual language is displayed, the process can end.

Figure 9:
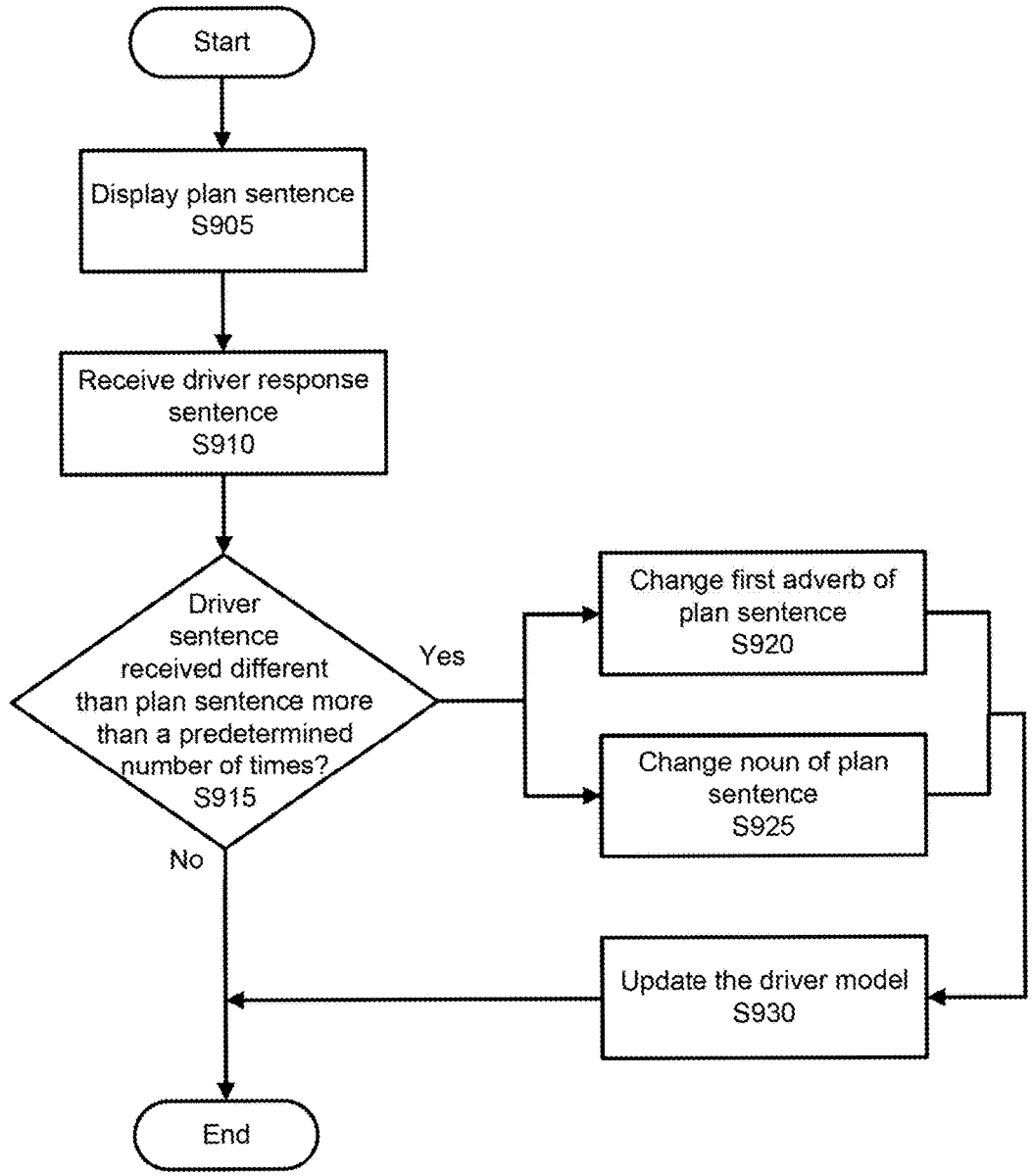
FIG. 9 is a flowchart of a method for personalization of the visual language.

FIG. 9 is a flowchart of a method for causing the system 100 to update the driver model 440.

In S905, the system 100 can display the plan sentence in the autonomous vehicle for the operator of the autonomous vehicle.

In S910, the system 100 can receive a driver response sentence.

In S915, it can be determined if the driver response sentence received does not match the displayed plan sentence more than a predetermined number of times. If the driver response sentence does match the plan sentence (or if the number of times it doesn't match is not more than the predetermined number of times) then the process can end. However, if the driver response sentence does not match the plan sentence more than the predetermined number of times, then the plan sentence can change the first adverb 326 of the plan sentence in S920 (and perhaps also the operation of the vehicle) if such an operational change lies within the scope of the vehicle rules and/or change the noun 302 of the plan sentence in S925 for cases when the deviation of the plan sentence indicates that a change of operator is preferred. In other words, because the driver response sentence does not match the plan sentence, the operator may be indicating that the displayed plan sentence does not match the operator's driver style. Therefore, the plan sentence can be customized by changing the visual language to more closely match the operator's driver style and autonomous vehicle operation preferences. After one or more of the first adverb 326 and the noun 302 have been changed in S920 and S925, respectively, the changes can be reflected in the driver model 440.

In S930, the driver model can be updated to reflect the personalization of the plan sentence displayed using the visual language in specific situations. After the driver model has been updated, the process can end.

In an embodiment, after the plan sentence is displayed, the system 100 may wait for confirmation from the operator before executing the vehicle maneuver displayed as the plan sentence. The operator confirmation may be a voice command or received via a tactile interaction with the HMI 150.

An advantage of the system 100 can be displaying the visual language such that the visual language includes a visual syntax where visual elements of information and/or warning share a common basis to more easily convey complex information. Further, an operator of the autonomous vehicle can process individual warnings and/or information more quickly, even when they have never seen a particular plan sentence or a specific part of a plan sentence. Additionally, because the operator will be able to more quickly identify the maneuvers that the autonomous vehicle plans to execute based on the information displayed in the plan sentence, the operator may feel more secure in the operation of the autonomous vehicle as the operator can be confident that the autonomous vehicle is planning to execute an appropriate and safe maneuver. Also, because the operator can clearly identify the maneuvers the autonomous vehicle intends to make, the operator may have enough time to decide that they would rather manually take control of the autonomous vehicle for various safety concerns, driving style/preferences, and the like.

Another advantage of the system 100 can include the personalization of the autonomous vehicle driving experience. Should the operator decide to take over the autonomous vehicle in specific situations more than a predetermined number of times, then the driver model 440 can be updated to reflect the operator's driving style and personal preferences such that the next time the system 100 encounters that specific situation, the plan sentence displayed will be updated to reflect the operator's personalization of the visual language, and the autonomous vehicle will execute the maneuver accordingly.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. An autonomous vehicle pictorial language system comprising:
   a plurality of sensors;
   a driver preferences database;
   a human-machine interface; and
   a processing circuitry configured to
      receive output from the plurality of sensors,
      receive a driver model from the driver preferences database, the driver model predicting driver action in a plurality of driving situations based on a safety margin defined in the driver preferences, and
      display a pictorial language via the human-machine interface in response to the output from the plurality of sensors and the driver model,
   wherein the pictorial language includes one or more of a noun, verb, first adverb, object classifier, and second adverb to construct a plan sentence.

2. The autonomous vehicle pictorial language system of claim 1, wherein the processing circuitry is further configured to
   display the plan sentence,
   receive a driver response sentence,
   determine if the driver sentence received does not match the plan sentence more than a predetermined number of times,
   change the first adverb of the plan sentence in response to the driver sentence not matching the plan sentence more than the predetermined number of times,
   change the noun of the plan sentence in response to the driver sentence not matching the plan sentence more than the predetermined number of times, and
   update the driver model in response to one or more changes to the first adverb and the noun.

3. The autonomous vehicle pictorial language system of claim 2, wherein driver confirmation of the plan sentence causes the vehicle to execute a maneuver displayed by the plan sentence when the driver would otherwise execute the maneuver manually.

4. The autonomous vehicle pictorial language system of claim 2, wherein the driver response sentence is constructed via output received from manual operations executed by the driver.

5. The autonomous vehicle pictorial language system of claim 2, wherein the pictorial language is displayed as the plan sentence.

6. The autonomous vehicle pictorial language system of claim 5, wherein a determination of the noun via the plurality of sensors and the driver model causes the human-machine interface to display a color associated with the noun based on the determination of the noun to construct the plan sentence.

7. The autonomous vehicle pictorial language system of claim 5, wherein a determination of the first adverb via the driver model, the verb, laws associated with a location of the vehicle, and vehicle rules causes the human-machine interface to display an image associated with the first adverb based on the determination of the first adverb to construct the plan sentence.

8. The autonomous vehicle pictorial language system of claim 5, wherein a determination of the object classifier via the plurality of sensors causes the human-machine interface to display an image associated with the object classifier based on the determination of the object classifier to construct the plan sentence.

9. The autonomous vehicle pictorial language system of claim 5, wherein a determination of the second adverb via the plurality of sensors and the object classifier causes the human-machine interface to display an image associated with the second adverb based on the determination to construct the plan sentence.

10. The autonomous vehicle pictorial language system of claim 5, wherein the pictorial language includes visual syntax such that visual elements share a common basis that allow for structured layering of information to display complex information.

11. The autonomous vehicle pictorial language system of claim 6, wherein the plurality of sensors further determines road structure and sensor quality, such that the sensor quality further determines system health, to determine the noun.

12. The autonomous vehicle pictorial language system of claim 1, wherein the plurality of sensors includes LIDAR, Radar, V2X, at least one camera, ultrasonics, and GPS.

13. The autonomous vehicle pictorial language system of claim 12, wherein a determination of the verb via the at least one camera, the Radar, and the GPS causes the human-machine interface to display an image associated with the verb based on the determination of the verb to construct the plan sentence.

14. The autonomous vehicle pictorial language system of claim 13, wherein the at least one camera, Radar, and GPS determine road structure, the GPS also being utilized to determine laws associated with a location of the vehicle, to determine the verb.

15. The autonomous vehicle pictorial language system of claim 14, wherein the at least one camera is used independently or in combination with the GPS to determine laws associated with the location of the vehicle.

16. A method for displaying a pictorial language executed by a processing circuitry and comprising:

receiving output from a plurality of sensors;

receiving a driver model from a driver preferences database, the driver model predicting driver action in a plurality of driving situations based on a safety margin defined in the driver preferences; and displaying a pictorial language via a human-machine interface in response to the output from the plurality of sensors and the driver model, wherein the pictorial language includes one or more of a noun, verb, first adverb, object classifier, and second adverb to construct a plan sentence.

17. The method of claim 16, further comprising:

displaying the plan sentence;

receiving a driver response sentence;

determining, via the processing circuitry, if the driver sentence received does not match the plan sentence more than a predetermined number of times;

changing the first adverb of the plan sentence in response to the driver sentence not matching the plan sentence more than the predetermined number of times;

changing the noun of the plan sentence in response to the driver sentence not matching the plan sentence more than the predetermined number of times; and updating the driver model in response to one or more changes to the first adverb and the noun.

18. A non-transitory computer-readable storage medium storing computer-readable instructions that, when executed by a computer, cause the computer to perform a method comprising:

receiving output from a plurality of sensors;

receiving a driver model from a driver preferences database, the driver model predicting driver action in a plurality of driving situations based on a safety margin defined in the driver preferences; and displaying a pictorial language via a human-machine interface in response to the output from the plurality of sensors and the driver model, wherein the pictorial language includes one or more of a noun, verb, first adverb, object classifier, and second adverb to construct a plan sentence.

19. The method of claim 18, further comprising:

displaying the plan sentence;

receiving a driver response sentence;

determining if the driver sentence received does not match the plan sentence more than a predetermined number of times;

changing the first adverb of the plan sentence in response to the driver sentence not matching the plan sentence more than the predetermined number of times;

changing the noun of the plan sentence in response to the driver sentence not matching the plan sentence more than the predetermined number of times; and updating the driver model in response to one or more changes to the first adverb and the noun.

\* \* \* \* \*